United States Patent

[11] 3,604,731

| [72] | Inventor | William H. Petersen<br>Metairie, La. |
|---|---|---|
| [21] | Appl. No. | 825,781 |
| [22] | Filed | May 19, 1969 |
| [45] | Patented | Sept. 14, 1971 |
| [73] | Assignee | Shell Oil Company<br>New York, N.Y. |

[54] SIMULTANEOUS PIPELINE-WELLHEAD CONNECTIONS
9 Claims, 7 Drawing Figs.

| [52] | U.S. Cl. | 285/29,<br>29/429, 166/0.6, 285/137, 285/302, 285/317 |
|---|---|---|
| [51] | Int. Cl. | F16l 39/04 |
| [50] | Field of Search | 205/24–29,<br>18, 137, 137 A, 302, 317; 166/0.6; 29/429 |

[56] References Cited
UNITED STATES PATENTS

| 3,090,437 | 5/1963 | Geer | 285/18 X |
| 3,290,063 | 12/1966 | Haeber | 285/302 X |
| 3,339,632 | 9/1967 | Lewis | 166/0.6 |
| 3,347,311 | 10/1967 | Word | 166/0.6 |
| 3,353,595 | 11/1967 | Nelson et al. | 166/0.6 |
| 3,358,753 | 12/1967 | Haeber | 166/0.6 |

*Primary Examiner*—Dave W. Arola
*Attorneys*—J. H. McCarthy and T. R. Lampe

ABSTRACT: A method and apparatus for connecting a plurality of pipelines or the like to an underwater installation in which a "bundle" of coextensive pipelines is pulled by suitable means toward the installation where rotational alignment means carried by the installation and by the end of the pipeline bundle cooperate to rotate the bundle into a predetermined position. The pipelines may then be connected in fluidtight relationship with corresponding flowlines carried by the underwater installation.

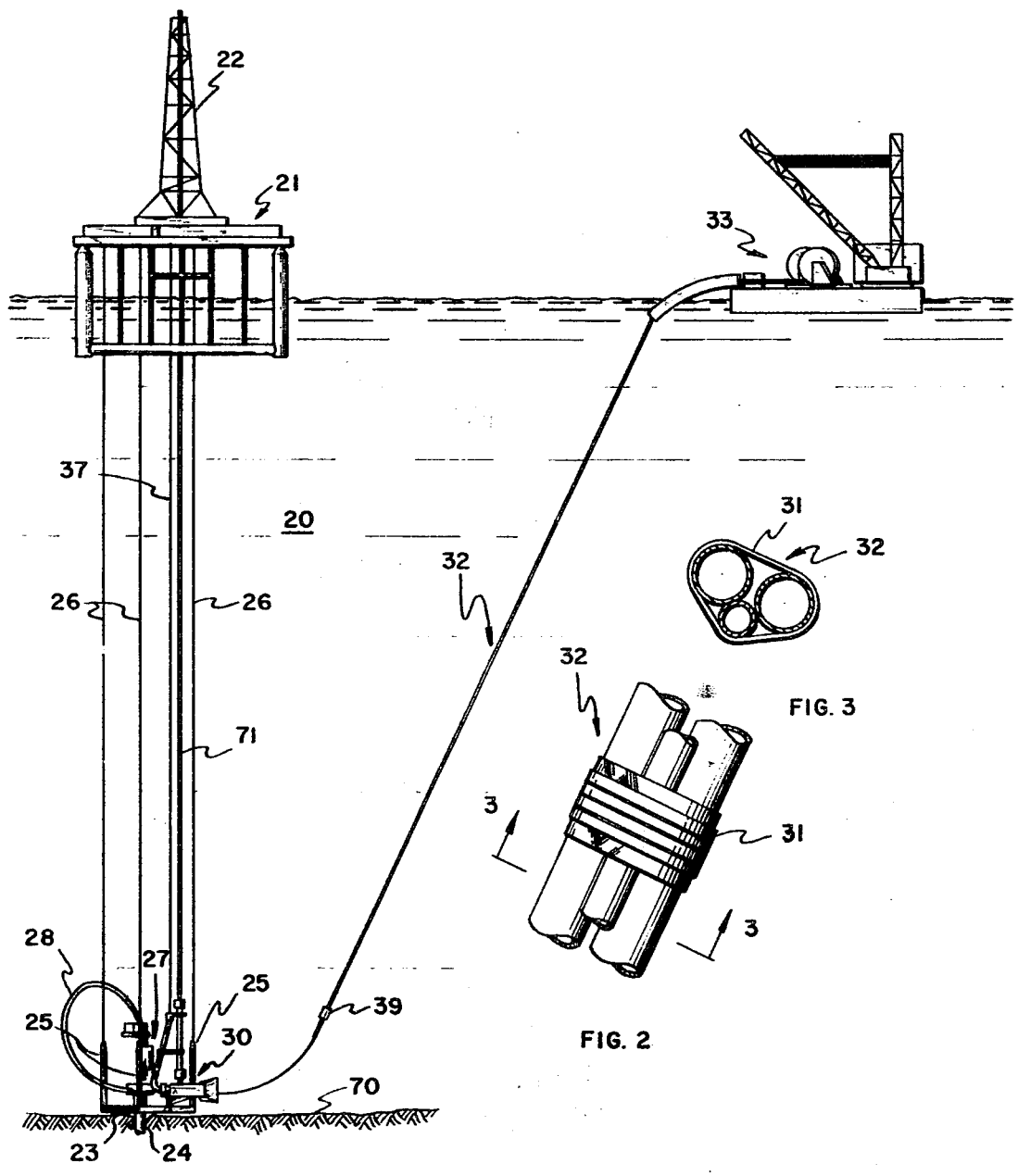

INVENTOR:
WILLIAM H. PETERSEN

INVENTOR:
WILLIAM H. PETERSEN
BY:
HIS ATTORNEY

SIMULTANEOUS PIPELINE-WELLHEAD CONNECTIONS

BACKGROUND OF THE INVENTION

1. Field of the Invention

This invention relates to offshore fluid-handling equipment and more particularly to a method and apparatus for remotely coupling a plurality of coextensive conduits or flowlines to an underwater installation positioned on or near the floor of a body of water.

2. Description of the Prior Art

For many years, offshore wells have been drilled either from stationary platforms anchored to the ocean floor, movable barges temporarily positioned on the ocean floor, or movable barges floating on the body of water in which drilling operations are being conducted. Regardless of the manner in which the wells are drilled, most wells have been completed in a manner such that the outermost tubular member of the well extends upwardly from the floor of the body of water to a point above the surface of the body of water where a wellhead assembly or "Christmas tree" is mounted for controlling the production of the well.

One disadvantage in the arrangement is that the wellheads extending above the surface of a body of water constitute a hazard to navigation in the vicinity of the well. In addition, when such wellheads are positioned in salt water, the structure extending above the water is subject to the corrosive action of salt water and air. On the other hand, when the wellhead and/or casing head is positioned above the surface of the body of water, there is an advantage in that the flow handling and controlling components in the wellhead may be readily secured thereto and adjusted by an operator working from a platform adjacent to the wellhead structure.

More recently, methods and apparatus have been developed for drilling and completing oil and gas wells on the ocean floor in the manner such that after completion of the well, the wellhead assembly is positioned beneath the surface of the ocean preferably on the floor thereof. When the wellhead assemblies are positioned at depths greater than diver capabilities the coupling of conduits or flowlines to the wellhead assemblies presents a new and difficult operation acquiring specialized equipment that can be operated remotely from the water surface.

The problem of connecting flowlines to installations submerged in very deep water is increased because of the high pressures involved and the difficulty of handling long lengths of pipe remotely. The high pressure encountered in deep water generally makes the use of flexible connections impractical since the flexible connectors or conduits are very expensive and relatively rigid when fabricated to withstand the high pressure encountered. Long lengths of pipe are difficult to handle in deep water both because of the mass of pipe involved and the remoteness of the handling operation.

In addition, it is becoming increasingly more desirable to connect a plurality of pipelines to an underwater installation in one single operation. Generally, a bundle of flowlines or conduits, for example, three, are tied together and handled as a unitary structure. However, when connecting such a bundle to an underwater installation the bundle must be aligned not only axially with the corresponding fluid passages in the installation but the bundle also must be rotationally oriented so that each flowline or conduit will align with the proper corresponding fluid passage in the installation. The use of multiple flowlines is becoming an increasing likelihood in offshore operations, where a diversity of fluids are handled, for example, oil and gas, and also in the case of oil wells for providing additional flow communication with the well other than the oil-offtake flowline. This additional flow communication is desirable for introducing pumpable through-the-flowline tools into the well or for introducing work-over fluids or chemicals into the well.

An apparatus for connecting a single flowline to an offshore installation is described in the U.S. Pat. to Haeber No. 3,358,753 entitled "Underwater Flowline Installation." The apparatus and method described in this patent provides a satisfactory solution to the problem of connecting a flowline to an underwater installation in relatively deep water. However, the above-identified patent does not address itself to the problem of connecting a bundle of flowlines to an offshore installation and it is to this end that the subject invention is directed.

SUMMARY

It summary, the subject invention provides an apparatus and method to facilitate the remote joining of a plurality of flowlines to an underwater installation. An underwater installation is positioned near the floor of a body of water and has extending therefrom a plurality of fluid flowlines adapted to mate with a corresponding number of flowlines in a flowline bundle which is positioned along the floor of a body of water. The bundle of flowlines is pulled toward the installation and as they are so pulled suitable means serve to rotationally align the flowlines in the bundle with the corresponding flowlines extending from the installation. After the flowline bundle is pulled into alignment, it is anchored in place and a mechanical fluidtight coupling is made between the bundle of flowlines and the installation.

BRIEF DESCRIPTION OF THE DRAWINGS

FIG. 1 is an elevational view of an underwater installation showing the bundle of flowlines to be attached thereto.

FIG. 2 is a side view of a position of the flowline bundle.

FIG. 3 is a cross-sectional view of the flowline bundle taken along the line 3—3 of FIG. 2.

DESCRIPTION OF THE PREFERRED EMBODIMENT

Figure 4:
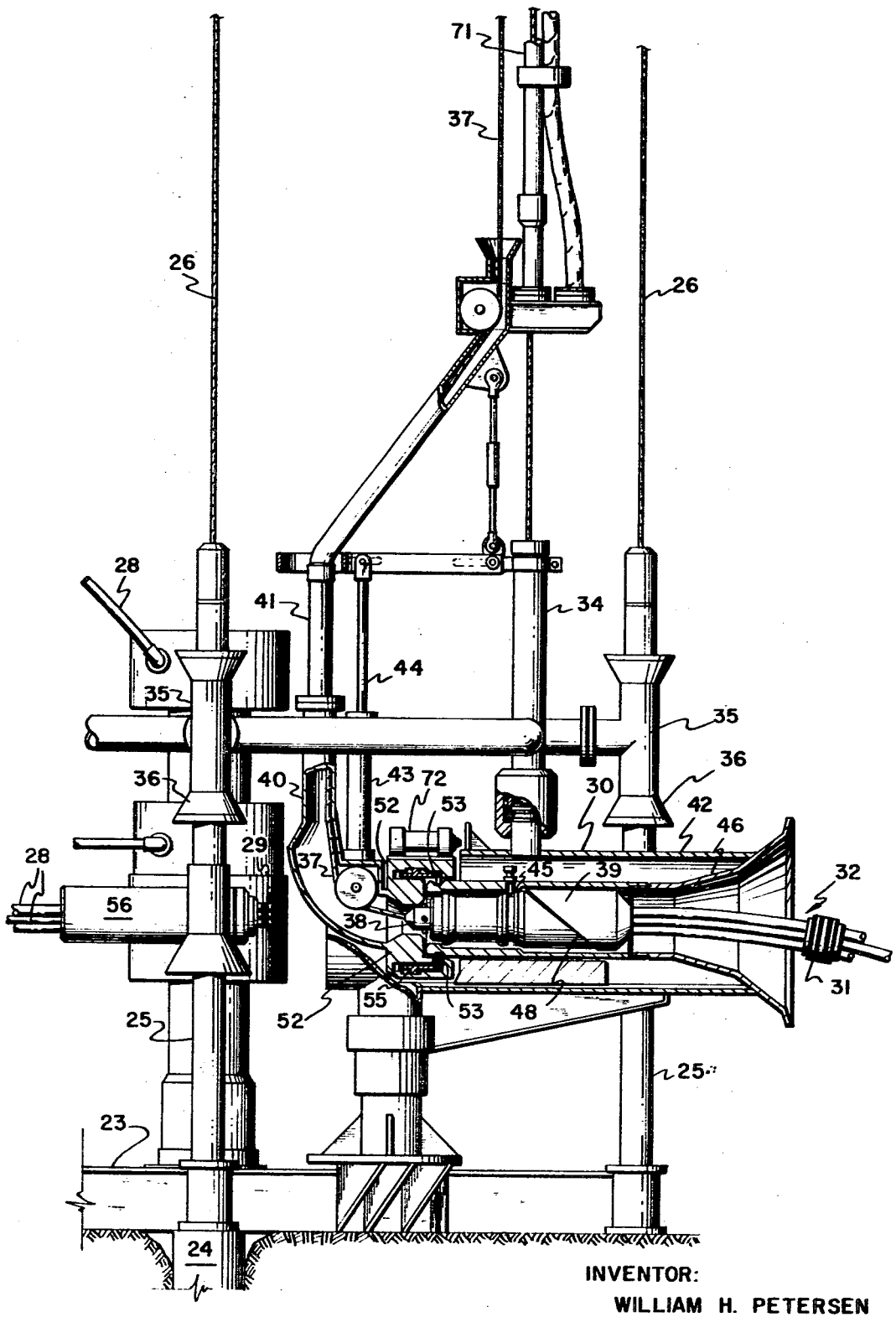
FIG. 4 is an elevational view in partial section of an underwater installation and equipment in accordance with the invention.

Referring to FIG. 1 of the drawing there is illustrated an application of the invention in use in a body of water 20. In order to facilitate the application of the invention, an operating station taking the form of a floating platform or barge 21, is illustrated as floating on the surface of the body of water 20 in a position approximately above a preselected underwater installation. The barge 21 may be of any known construction and includes a suitable derrick 22 for use in performing drilling, completion or workover operations.

A wellhead support structure 23 is illustrated as being anchored to the ocean floor by means of a conductor pipe or surface casing 24 which is installed and preferably cemented in floor 70 of the body of water 20. The wellhead support structure 23 includes a plurality of guide columns 25 having guide cables 26 extending vertically therefrom to the floating barge 21. The purpose of the guide cables 26 is for guiding pieces of equipment from the barge 21 into alignment onto the wellhead support structure 23. For example, a production package 27 may be lowered down the guidelines 26 and positioned on the wellhead support structure 23 as shown in FIG. 1. As illustrated, the production package 27 is provided with one or more flowline portions 28 which emanate near the top of the production package and gently curve outwardly and downwardly finally terminating in a plurality of matable end portions 29 (see FIG. 4) which lie in a substantially horizontal plane.

The underwater installation including the production package 27, is now ready to produce fluids from beneath the water floor 70 which fluids will leave the installation via the flowline portions 28. However, before the well may be put on production, it is necessary to perform the operation of connecting ocean-floor flowlines adapted to be positioned along the floor of the body of water 20 to the plurality of matable ends 29.

As underwater installation and environment substantially as heretofore described, is disclosed in greater detail in the aforementioned U.S. Pat. No. 3,358,753 which issued to J. A. Haeber on Dec. 19, 1967. The subject invention, however, is an improvement on the system described in this patent in that it provides for the simultaneous connection of multiple pipelines to production package 27 through the flowlines portions 28.

Referring to FIGS. 1 and 4, there is shown flowline-anchoring means in the form of a combination ocean-floor flowline pulling and alignment package 30 constructed in a manner such that a plurality of ocean-floor flowlines may be pulled into spaced axial alignment with the matable ends 29 of the installation flowline portions 28 and subsequently connected thereto. The ocean-floor flowlines are preferably tied together by means of bands 31 as shown in FIG. 2 to form an ocean-floor flowline bundle 32. As shown in FIGS. 2 and 3, a bundle of three pipelines is disclosed, each pipeline being of a different diameter; however, any number and combination of pipelines, hoses and/or electrical cables could conceivably be connected in this manner. After the pipeline bundle 32 is pulled into position and connected to the production wellhead 27 as will be hereinafter described, the bundle may be laid along the floor of the body of water 20 by means of a pipe-laying barge 33 shown in FIG. 1. After the connection is made, the barge 33 is moved away from the underwater installation as the bundle 32 is paid out and laid along the ocean floor. The subject pipe connection apparatus may also be used to connect pipelines that are initiated at a platform (or other control station) and terminated at the production wellhead 27. In these installation cases the pipeline-pulling bundle would preferably be laid down on the ocean floor adjacent to the wellhead and then pulled laterally across the sea floor into the alignment and pulling package 30.

Again referring to FIG. 4, the combination pulling and alignment package 30 is positioned on the wellhead support structure 23 after being lowered into position by means of a running string 71 preferably made of drill pipe and suspended from the barge 21. The combination pulling and alignment package 30 is removably attached to a running tool or guide frame 34 which is provided with guide tubes 35 (at least two) which slide along respective guide cables 26. Preferably, each of the guide tubes 36 has a downwardly flared flange 36 attached or integrally formed on its lower end which serves to align the guide tubes 35 as they move downward onto the guide posts 25.

A drawline 37 is installed through the pulling and alignment package 30 prior to its being lowered onto the wellhead support structure 23 so that after the package 30 is lowered into position the drawline 37 extends from a location on the barge or platform 21 downwardly and through the combination package 30 and then back up through the water to the flowline-lay barge 33 as shown in FIG. 1. The barge end of the drawline 37 is provided with a special flowline-pulling tool 38 which is adapted to be releasably secured inside a specially constructed flowline head 39 formed on the initial end of the flowline bundle 32.

The flowline bundle pulling and alignment package 30 will now be described in greater detail. The package 30 is comprised of basically two components: first, a tubular drawline guide 40 telescopically attached to a depending tubular portion 41 of the running tool or guide frame 34 and second, alignment means 42 for receiving and properly orienting the flowline bundle 32. The drawline guide 40 also carries a hydraulic cylinder 43 having a piston 44 which is attached to the guide frame 34 to thereby provide for selectively moving the drawline guide tube 40 up out of alignment with the alignment means 42. A second hydraulic cylinder 72 is provided to first push guide 40 away from alignment means 42 before cylinder 43 is activated to elevate drawline guide 40. The alignment means 42 includes a cylindrical pulling head receptacle 45 reciprocally mounted within the alignment means 42 having a fixed flared horn 46 adapted to align with one end of the receptacle 45.

Figure 6:
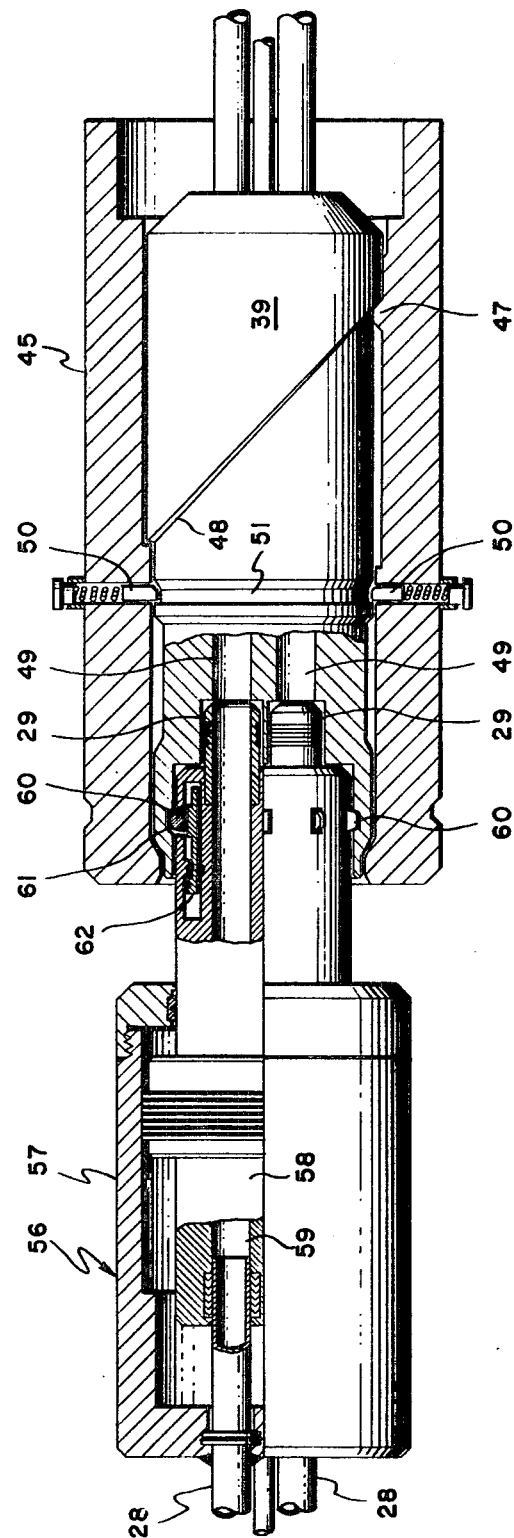
FIG. 6 is a cross-sectional view of the flowline alignment apparatus employed with the subject invention.

As best seen in FIG. 6, the inner surface of the receptacle 45 is formed with rotational alignment means in the form of a stop 47 which engages rotational alignment means in the form of a mating helical ridge 48 formed on the exterior of the pulling head 39. When the pulling head 39 is pulled into the receptacle 45, helical ridge 48 engages the stop 47 thereby causing the pulling head to rotate until the pulling head is firmly landed in place. The arrangement of the rotational alignment means 47 and 48 is such that throughbores 49 in the pulling head 39 are rotationally oriented in a predetermined position corresponding to the orientation of the matable ends 29 to thus place the throughbores 49 and the matable ends 29 in axial alignment. The pulling head 39 is held in place in the receptacle portion 45 by means of spring-loaded detents 50 carried in the wall of the receptacle 45 and adapted to engage a groove 51 formed in the outer periphery of the pulling head 39.

Referring again to FIG. 4, the lower end of the drawline guide 40 is provided with a collar 52 adapted to be removably connected to the pulling head receptacle 45. The collar includes pins 53 which are held in locking engagement in a groove 54 in the receptacle 45 by means of a hydraulically actuated sleeve 55.

The apparatus of this invention also provides suitable means for connecting the matable ends 29 in fluidtight relationship with the flowlines in the flowline bundle 32. As shown in detail in FIG. 6, the installation flowlines 28 terminate in an extensible connector assembly indicated generally by the numeral 56. Connector assembly 56 comprises an outer housing in the form of a cylinder 57 which houses a flowline connector piston 58 having throughpassages 59 in telescoping fluidtight relationship with the installation flowline portions 28. The throughpassages 59 terminate the other end of piston 58 at the matable ends 29. The piston 58 also includes a plurality of partially extensible dogs 60 adapted to releasably engage a suitable mating groove 61 formed in the pulling head 39. The dogs 60 may be selectively held in locked position by means of hydraulically actuated dog-locking sleeve 62.

Figure 5:
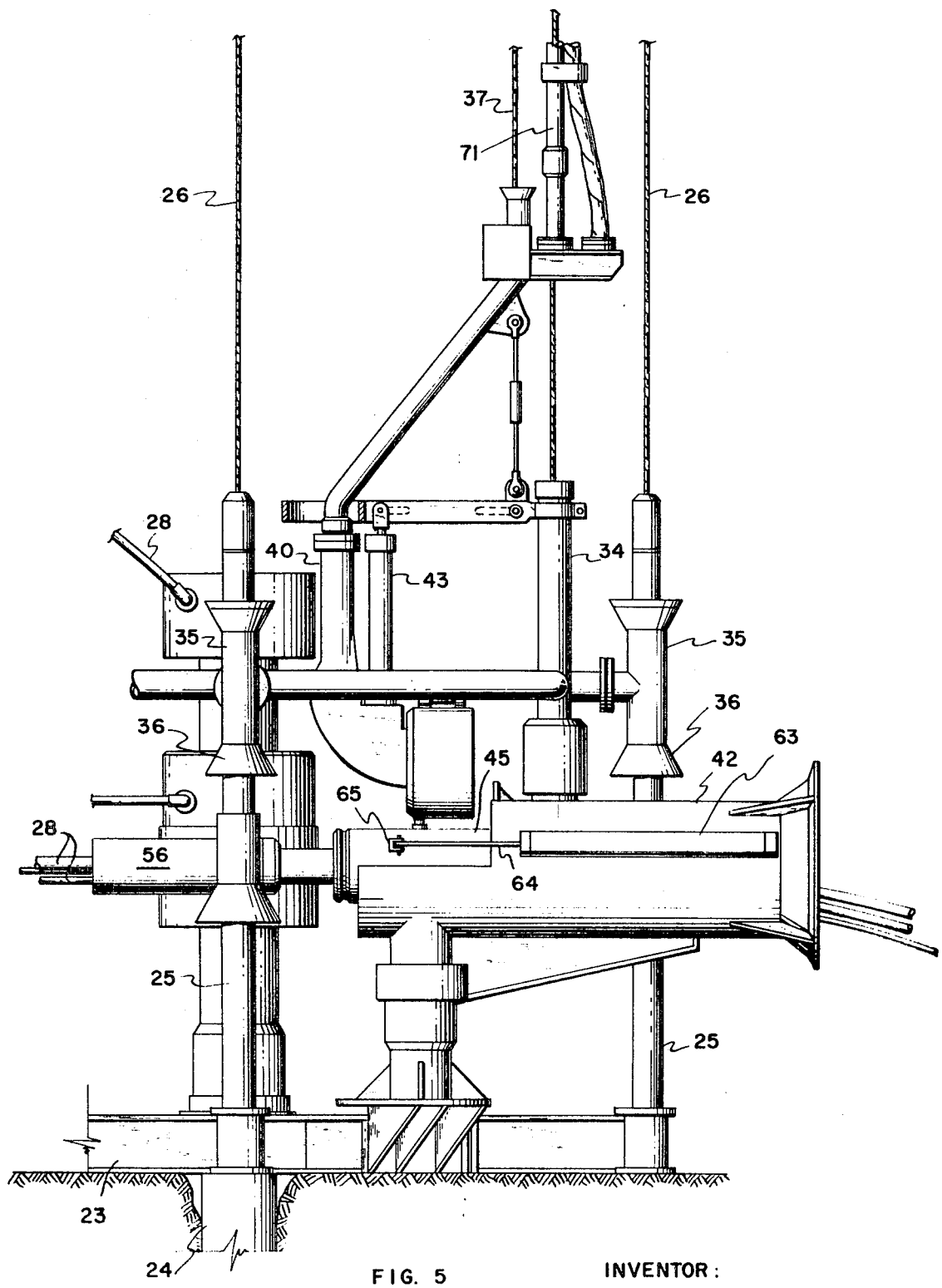
FIG. 5 is an elevational view similar to FIG. 4 showing a bundle of flowlines connected to the underwater installation.
Figure 7:
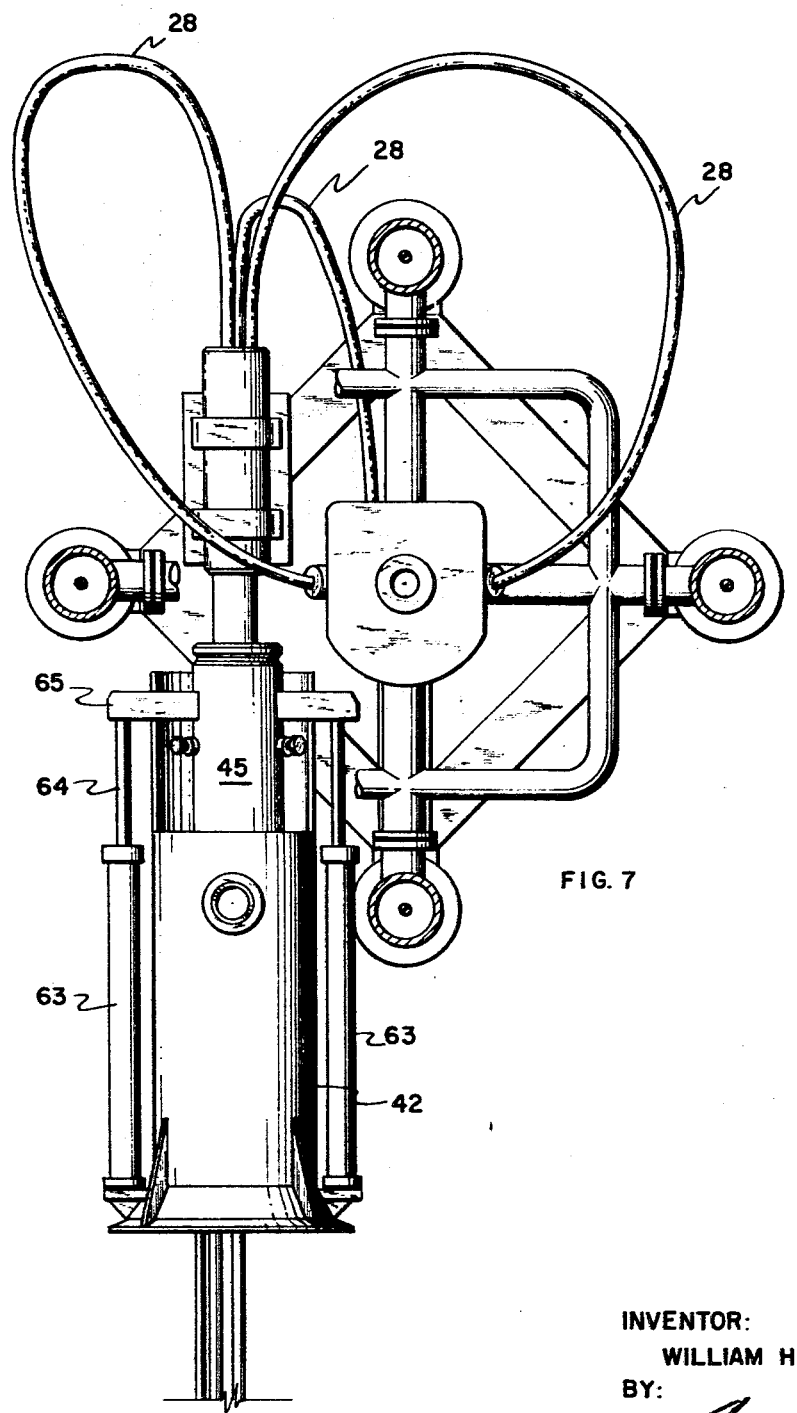
FIG. 7 is a plan view of the underwater installation and alignment apparatus showing a flowline bundle connected to the installation.

In addition, the entire assembly consisting of the pulling head receptacle 45 and the pulling head 39 may be extended toward the matable ends 29 by mans of hydraulic cylinders 63 as shown in FIGS. 5 and 7. The cylinders 63, of which there are preferably two, are rigidly connected at one end to the fixed alignment means 42 and carry pistons 64 which are attached to the pulling head receptacle 45 by means of brackets 65.

The sequence of operation of the subject arrangement will now be discussed with reference to the drawings. After the production package 27 is lowered into place on the wellhead support structure 23 as shown in FIG. 1, the flowline pulling and alignment package 30 is lowered into position on the wellhead support structure 23 as previously discussed in order to facilitate the connecting of the bundle of underwater flowlines 32 to the production package 27 via the flowline portions 28. At this point, drawline 37 is tensioned to thereby pull the flowline bundle 32 toward the pulling and alignment package 30. Continued tensioning of the drawline 37 causes the flowline pulling head 39 to enter the horn 46 where it is directed toward and into the pulling head receptacle 45. The interaction of stop 47 and helical ridge 48 rotates the pulling head 39 to a predetermined position so that the bores 49 in the pulling head 39 are axially aligned with matable ends 29. When the pulling head 39 is fully pulled into the receptacle 45 and positively abutted thereagainst, further tensioning of the drawline 37 will cause the drawline-release mechanism 38 to automatically disengage from the pulling head where it is received by the collar 52. Hydraulic fluid is then introduced into the hydraulic actuating sleeve 55 of collar 52 to disconnect the collar from receptacle 45. Hydraulic fluid is then introduced to cylinder 72 to move the drawline tube 40 away from receptacle 45 and then to cylinder 43 to elevate the drawline tube 40 and collar 52 upwardly into the position shown in FIG. 5. When the drawline tube 40 and collar 52 are retracted to the position shown in FIG. 5, the space between the matable ends 29 of the installation flowline portions 28 and the flowline-pulling head 39 is cleared to thus facilitate the final connection of the pulling head to the matable ends 29.

The final connection of the bundle of flowlines 32 to production package 27 via the flowline portions 28 is accomplished in one of three ways. The flowline connector 56 may be actuated to extend the matable ends 29 toward the pulling head 39 or the cylinders 63 may be actuated to extend the pulling head receptacle portion 45 and the pulling head 39 toward the matable ends 29. As a third alternative, both the flowline connector 56 and the hydraulic cylinders 63 may be actuated so that both the matable ends 29 and the pulling head 39 are brought toward each other into mating contact as is illustrated in FIG. 5. It is anticipated that in accordance with this invention, any of the above methods of effecting the final connection may be employed by one practicing the invention. For example, where a large number of flowlines are employed in the flowline bundle 32, and/or where the flowlines are large and rather cumbersome, it may be more desirable to effect the connection by moving only the matable ends carried in the connector box 56 rather than attempting to move the pulling head 39 which is attached to the flowline bundle 32.

It should also be noted that the subject invention is in no way intended to be limited to a flowline bundle of three flowlines as illustrated in the drawings, but may be employed with bundles having any number of flowlines provided, of course, that a like number of matable ends 29 are provided in the flowline connector 56. In addition, it is to be understood that the arrangement herein disclosed may also be used with other forms of underwater installations, for example, underwater collector facilities and platforms and may also be employed for connecting other types of conduits, for example, hoses and electrical cables.

I claim:

1. Apparatus for use at an underwater installation for selectively installing a plurality of conduits onto said installation, said apparatus comprising:
   plurality of coextensive conduits adapted to be positioned along the floor of a body of water and selectively movable from an underwater position remote from said installation into engagement with said installation;
   pulling head means attached to one end of said conduits and having throughbores in axial alignment with said conduits;
   conduit-anchoring means securable to said installation, said anchoring means including a receiver portion for receiving said pulling head means;
   first rotational alignment means carried by the outer surface of said pulling head means for selectively rotating said pulling head means into engagement on said receiver portion whereby said throughbores are axially aligned with said receiver portion;
   second rotational alignment means carried by the inner surface of said receiver portion and adapted to selectively mate with said first rotational alignment means to thereby rotationally align said pulling head means within said receiver portion; and,
   conduit-pulling means adapted to be operatively secured to said installation, said conduit pulling means including:
   a cable;
   connector means connected to one end of said cable and adapted to be detachably secured to said pulling head means; and, a cable guide means in which said cable is adapted to move, one end of said cable guide means being normally operatively positioned adjacent said anchoring means and opening therein with the axis of said opening lying along substantially the same axis as the receiver portion thereof, and said cable guide means being selectively movable out of said normally operative position.

2. An apparatus as defined in claim 1 wherein at least one of said rotational alignment means comprises a helical shoulder.

3. An apparatus as defined in claim 1 wherein said conduit anchoring means includes remotely operable means for removably securing said anchoring means to said installation.

4. An apparatus as defined in claim 1 including prime mover means operatively engaging said cable guide means for moving said cable guide means out of axial alignment with said pulling head means.

5. An apparatus as defined in claim 4 including installation conduits secured to and extending from said installation and having the free ends thereof normally arranged in spaced axial alignment with the receiver portion of said anchoring means.

6. An apparatus as defined in claim 5 including extensible connector means carried by the free ends of said installation conduits for extending said head conduits toward and into sealed fluidtight relation with the throughbores in said pulling head means, when said pulling head means is positioned in said receiver portion.

7. An apparatus as defined in claim 5 including pulling head prime mover means operatively engaging said pulling head means for extending said pulling means means toward and into sealed fluidtight relation with said free ends.

8. A method of remotely connecting a plurality of coextensive flowlines to an installation submerged in a body of water, said installation having a plurality of flowlines extending therefrom and terminating in matable ends, said method comprising:
   providing the installation with flowline alignment means;
   arranging flowline pulling means including cable means and a guide therefor in operative association with said flowline alignment means;
   securing one end of said cable means to a plurality of coextensive ocean-floor flowlines, having cooperable matable ends adapted to be coupled to the matable ends of said installation flowlines, said ocean-floor flowlines being selectively movable from a point remote from said installation to engagement with said installation;
   applying tension to said cable means to pull said ocean-floor flowlines toward and into contact with said alignment means;
   rotationally orienting said plurality of ocean-floor flowlines via said installation flowline alignment means to place them into axial alignment with said installation flowlines;
   anchoring the ends of said ocean-floor flowlines in axial alignment and at a spaced distance from the matable ends of said installation flowlines;
   removing any interfering apparatus from the space between the axially aligned ends of said flowlines; and
   extending the matable ends of said installation flowlines toward matable ends of said ocean-floor flowlines.

9. A method as defined in claim 8 further including the step of extending the matable ends of said ocean-floor flowlines towards the matable ends of said installation flowlines.